US012267412B2

(12) United States Patent
Gilchrist et al.

(10) Patent No.: US 12,267,412 B2
(45) Date of Patent: Apr. 1, 2025

(54) TECHNOLOGIES FOR SECURE INTER-PROCESSOR COMMUNICATIONS

(71) Applicant: Schlage Lock Company LLC, Carmel, IN (US)

(72) Inventors: Brian Gilchrist, Golden, CO (US); Joseph W. Baumgarte, Carmel, IN (US); Gregory Ross, Carmel, IN (US); Terry Small, Indianapolis, IN (US); Aaron Schlicht, Golden, CO (US)

(73) Assignee: Schlage Lock Company LLC, Carmel, IN (US)

( * ) Notice: Subject to any disclaimer, the term of this patent is extended or adjusted under 35 U.S.C. 154(b) by 357 days.

(21) Appl. No.: 17/727,402

(22) Filed: Apr. 22, 2022

(65) Prior Publication Data

US 2023/0344621 A1  Oct. 26, 2023

(51) Int. Cl.
*H04L 9/08* (2006.01)
*H04L 9/06* (2006.01)
*H04L 9/12* (2006.01)

(52) U.S. Cl.
CPC .......... *H04L 9/0825* (2013.01); *H04L 9/0643* (2013.01); *H04L 9/0877* (2013.01); *H04L 9/0891* (2013.01); *H04L 9/12* (2013.01)

(58) Field of Classification Search
CPC ... H04L 9/0825; H04L 9/0643; H04L 9/0877; H04L 9/0891; H04L 9/12; H04L 9/0662; H04L 9/3273
See application file for complete search history.

(56) References Cited

U.S. PATENT DOCUMENTS

| 4,402,046 A | 8/1983 | Cox et al. |
| 4,719,622 A | 1/1988 | Whipple |

(Continued)

FOREIGN PATENT DOCUMENTS

| CN | 108179929 A | 6/2018 |
| EP | 0047238 B1 | 11/1988 |
| EP | 0747820 A2 | 5/2003 |

OTHER PUBLICATIONS

Visteon, "Securing Inter-Processor Communication in Automotive ECUs", Nov. 8, 2018, 6 pages.

(Continued)

*Primary Examiner* — Mohammed Waliullah
(74) *Attorney, Agent, or Firm* — Taft Stettinius & Hollister LLP

(57) ABSTRACT

An access control device according to an embodiment includes a lock mechanism, a digital core PCBA including at least one first processor and at least one first memory and is configured to facilitate wireless communications, wherein the at least one first memory is provisioned with a master initialization salt key, and an access core PCBA electrically coupled to the digital core PCBA, that includes at least one second processor and at least one second memory, and is configured to facilitate access control, and wherein the at least one second memory is provisioned with an access core initialization key derived from the master initialization salt key, wherein the digital core PCBA establishes a secure communication channel with the access core PCBA via an electrical connection between the digital core PCBA and the access core PCBA based on the master initialization salt key and the access core initialization key.

18 Claims, 8 Drawing Sheets

(56) References Cited

U.S. PATENT DOCUMENTS

| | | | |
|---|---|---|---|
| 5,101,478 A | 3/1992 | Fu et al. | |
| 5,432,915 A | 7/1995 | Jippo | |
| 9,252,951 B1* | 2/2016 | Katzer | G07C 9/00571 |
| 9,530,262 B2 | 12/2016 | Johnson | |
| 2003/0172271 A1* | 9/2003 | Silvester | H04L 63/0876 |
| | | | 713/170 |
| 2006/0288209 A1 | 12/2006 | Vogler | |
| 2009/0257590 A1 | 10/2009 | Ding | |
| 2011/0173450 A1 | 7/2011 | Knobbe et al. | |
| 2016/0103689 A1 | 4/2016 | Sanghi et al. | |
| 2016/0277368 A1* | 9/2016 | Narayanaswamy | |
| | | | G06F 21/6209 |
| 2018/0075262 A1* | 3/2018 | Auh | G06F 21/6227 |
| 2019/0032368 A1* | 1/2019 | Welbig | G07C 9/00182 |
| 2019/0239070 A1 | 8/2019 | Shin et al. | |
| 2020/0159930 A1* | 5/2020 | Venkateswaran | H04L 9/3247 |

OTHER PUBLICATIONS

International Search Report; International Searching Authority; International Application No. PCT/US2023/066112; Sep. 21, 2023; 2 pages.
Written Opinion of the International Searching Authority; International Searching Authority; International Application No. PCT/US2023/066112; Sep. 21, 2023; 7 pages.

* cited by examiner

TECHNOLOGIES FOR SECURE INTER-PROCESSOR COMMUNICATIONS

BACKGROUND

Access control systems typically involve the use of credentials to manage the operation of an access control device (e.g., a lock device). Access control devices often leverage multiple chipsets, circuitries, and/or cores to perform the various access control features. However, the communication path therebetween may be susceptible to tampering and/or security breaches. Accordingly, there is a need for improved technologies for securing inter-processor communications within an access control device.

SUMMARY

One embodiment is directed to a unique system, components, and methods for secure inter-processor communications. Other embodiments are directed to apparatuses, systems, devices, hardware, methods, and combinations thereof for secure inter-processor communications.

According to an embodiment, an electronic lock configured to be secured to a door having an exterior side and an interior side may include an exterior escutcheon on the exterior side of the door, an interior escutcheon on the interior side of the door, a digital core printed circuit board assembly (PCBA) positioned within the interior escutcheon, wherein the digital core PCBA comprises at least one first processor and at least one first memory and is configured to facilitate wireless communications, wherein the at least one first memory is provisioned with a master initialization salt key, and an access core PCBA electrically coupled to the digital core PCBA and positioned within the exterior escutcheon, wherein the access core PCBA comprises at least one second processor and at least one second memory and is configured to facilitate access control, wherein the at least one second memory is provisioned with an access core initialization key derived from the master initialization salt key, wherein the digital core PCBA establishes a secure communication channel with the access core PCBA via an electrical connection between the digital core PCBA and the access core PCBA based on the master initialization salt key and the access core initialization key.

In some embodiments, the access core PCBA may include a capacitive touch keypad.

In some embodiments, the access core PCBA may include at least one of a smart card antenna or a proximity antenna.

In some embodiments, the digital core PCBA may include a wireless communication circuitry.

In some embodiments, the access core initialization key may be derived based on an HMAC-based key derivation function (HKDF), a unique identifier of the access core, and the master initialization salt key.

In some embodiments, the digital core PCBA may communicate with the access core PCBA to perform mutual authentication.

In some embodiments, the at least one first processor of the digital core PCBA may generate the access core initialization key based on a unique identifier of the access core and the master initialization salt key, and each of the at least one first processor of the digital core PCBA and the at least one second processor of the access core PCBA may securely generate a set of operational keys using the access core initialization key.

In some embodiments, each of the at least one first processor of the digital core PCBA and the at least one second processor of the access core PCBA may generate a session key using at least one operational key of the set of operational keys.

In some embodiments, each of the at least one first processor of the digital core PCBA and the at least one second processor of the access core PCBA may periodically roll the session key.

In some embodiments, the set of operational keys may include a key transfer key, and the at least one first processor of the digital core PCBA may be configured to replace the master initialization salt key with a new master initialization salt key received from a management system, generate a new access core initialization key based on the new master initialization salt key and the unique identifier of the access core, encrypt the new access core initialization key using the key transfer key, and transmit the encrypted new access core initialization key to the access core PCBA.

According to another embodiment, an access control device may include a lock mechanism adapted to control access to a passageway, a digital core printed circuit board assembly (PCBA) that includes at least one first processor and at least one first memory and is configured to facilitate wireless communications, wherein the at least one first memory is provisioned with a master initialization salt key, and an access core PCBA electrically coupled to the digital core PCBA, wherein the access core PCBA includes at least one second processor and at least one second memory and is configured to facilitate access control, and wherein the at least one second memory is provisioned with an access core initialization key derived from the master initialization salt key, wherein the digital core PCBA establishes a secure communication channel with the access core PCBA via an electrical connection between the digital core PCBA and the access core PCBA based on the master initialization salt key and the access core initialization key.

In some embodiments, the access core PCBA may include a capacitive touch keypad.

In some embodiments, the access core PCBA may include at least one of a smart card antenna or a proximity antenna.

In some embodiments, the digital core PCBA may include a wireless communication circuitry.

In some embodiments, the access core initialization key may be derived based on an HMAC-based key derivation function (HKDF), a unique identifier of the access core, and the master initialization salt key.

In some embodiments, the digital core PCBA may communicate with the access core PCBA to perform mutual authentication.

In some embodiments, the at least one first processor of the digital core PCBA may generate the access core initialization key based on a unique identifier of the access core and the master initialization salt key, and each of the at least one first processor of the digital core PCBA and the at least one second processor of the access core PCBA may securely generate a set of operational keys using the access core initialization key.

In some embodiments, each of the at least one first processor of the digital core PCBA and the at least one second processor of the access core PCBA may generate a session key using at least one operational key of the set of operational keys.

In some embodiments, each of the at least one first processor of the digital core PCBA and the at least one second processor of the access core PCBA may periodically roll the session key.

In some embodiments, the set of operational keys may include a key transfer key, and the at least one first processor of the digital core PCBA may be configured to replace the master initialization salt key with a new master initialization salt key received from a management system, generate a new access core initialization key based on the new master initialization salt key and the unique identifier of the access core, encrypt the new access core initialization key using the key transfer key, and transmit the encrypted new access core initialization key to the access core PCBA.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
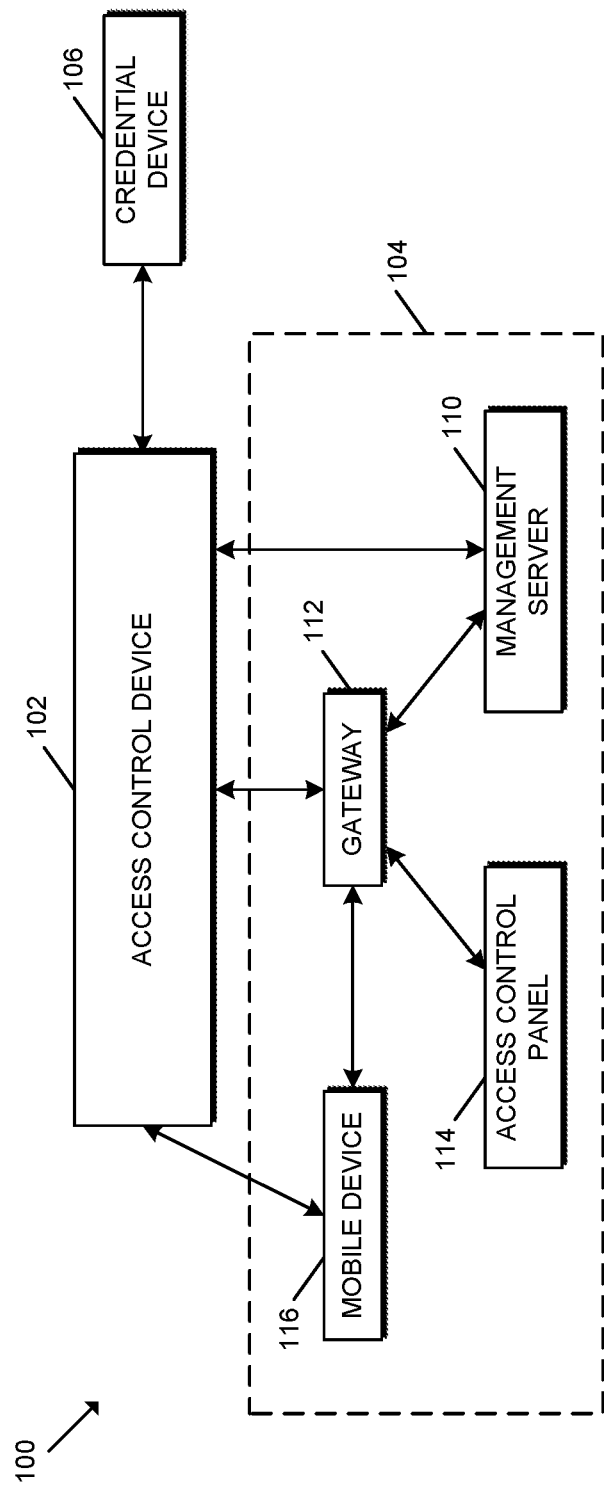
FIG. 1 is a simplified block diagram of at least one embodiment of an access control system for leveraging secure inter-processor communications within an access control device.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

It should be appreciated that certain electronic device manufacturers may commission electronic devices that use one cryptographic key (e.g., an AES key) to encrypt through-door communications for all product types and each individual device within each product type. However, if that one cryptographic key is compromised, the security of all products is compromised. The technologies described herein provide a high security solution with low hardware cost and a very small security breach "blast radius" if a particular device is compromised. For example, if a particular device is compromised, it may be compromised for the particular product rather than an entire suite of products. Additionally, in some embodiments, the technologies described herein also provide privacy and authentication without the added cost of electrical curve cryptography (ECC) chipsets (in hardware cost) and/or without the added time of performing certain high security routines (in firmware cost).

Referring now to FIG. 1, in the illustrative embodiment, an access control system 100 for leveraging secure inter-processor communications within an access control device is shown. The illustrative access control system 100 includes an access control device 102, a management system 104, and a credential device 106. Further, the management system 104 may include a management server 110, a gateway device 112, an access control panel 114, and/or a mobile device 116.

It should be appreciated that the access control device 102, the management system 104, the credential device 106, the management server 110, the gateway device 112, the access control panel 114, and/or the mobile device 116 may be embodied as any type of device or collection of devices suitable for performing the functions described herein. More specifically, in the illustrative embodiment, the access control device 102 may be embodied as any type of device capable of controlling access through a passageway. For example, in various embodiments, the access control device 102 may be embodied as an electronic lock (e.g., a mortise lock, a cylindrical lock, or a tubular lock) or a peripheral controller of a passageway. In some embodiments, the access control device 102 includes a lock mechanism configured to control access through a passageway. For example, in some embodiments, the lock mechanism may be configured to be positioned in a locked state in which access to the passageway is denied, or positioned in an unlocked state in which access to the passageway is permitted. In some embodiments, the lock mechanism may include a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments. Depending on the particular embodiment, the access control device 102 may include a credential reader or be electrically/communicatively coupled to a credential reader configured to communicative with credential devices 106.

In the illustrative embodiment, the credential device 106 may be embodied as any type of mobile device capable of communicating with the access control device 102 in order to exchange access-related information and/or otherwise performing the functions described herein. It should be appreciated that the credential device 106 may be embodied as a "passive" or "active" credential device depending on the particular device. For example, the credential device 106 may be embodied as a passive credential device having a credential identifier (e.g., a unique ID) stored therein and "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more passive credentials may be embodied as a proximity card, which is configured to communicate over a low frequency carrier of nominally 125 kHz, and/or a smartcard, which is configured to communicate over a high frequency carrier frequency of nominally 13.56 MHz. In other embodiments, the credential device 106 may be embodied as an "active" credential device such as a smartphone, powered dongle, and/or other mobile device. Accordingly, in some embodiments, it should be appreciated that the credential device 106 may include wireless communication circuitry for communicating with the access control device 102 and/or other devices via corresponding protocols (e.g., Wi-Fi, Bluetooth (e.g., including BLE), Zigbee, Z-Wave, Near Field Communication (NFC), Thread, ultra wideband (UWB), etc.).

As described herein, the management system 104 may be configured to manage credentials of the access control system 100. For example, the management system 104 may be responsible for ensuring that the access control devices 102 have updated authorized credentials, accept lists, block lists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the credential device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the credential device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one credential device 106, one management server 110, one gateway device 112, one access control panel 114, and one mobile device 116 are shown in the illustrative embodiment of FIG. 1, the system 100 may include multiple access control devices 102, management systems 104, credential devices 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate credential devices 106 in some embodiments.

Figure 2:
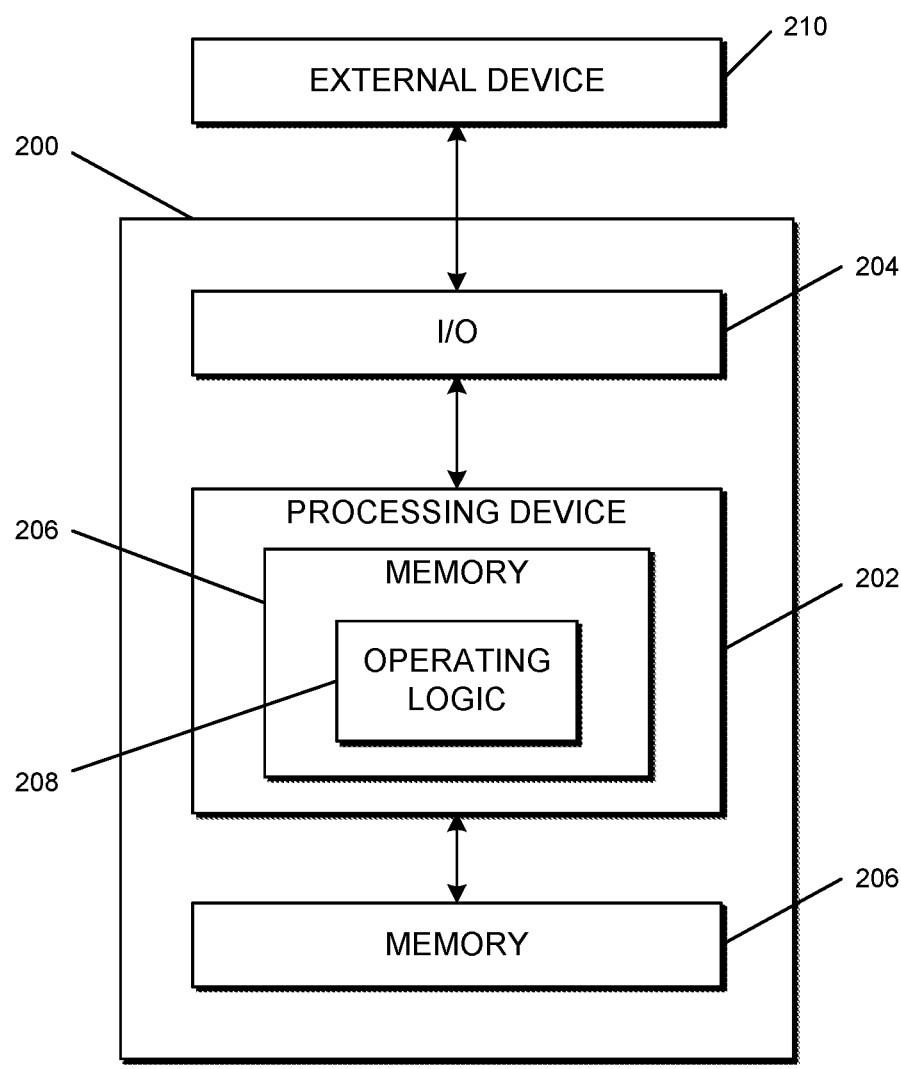
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an access control device, credential device, mobile device, management server, gateway device, and/or access control panel that may be utilized in connection with the access control device 102, the management system 104, the credential device 106, the management server 110, the gateway device 112, the access control panel 114, and/or the mobile device 116 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the UWB device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
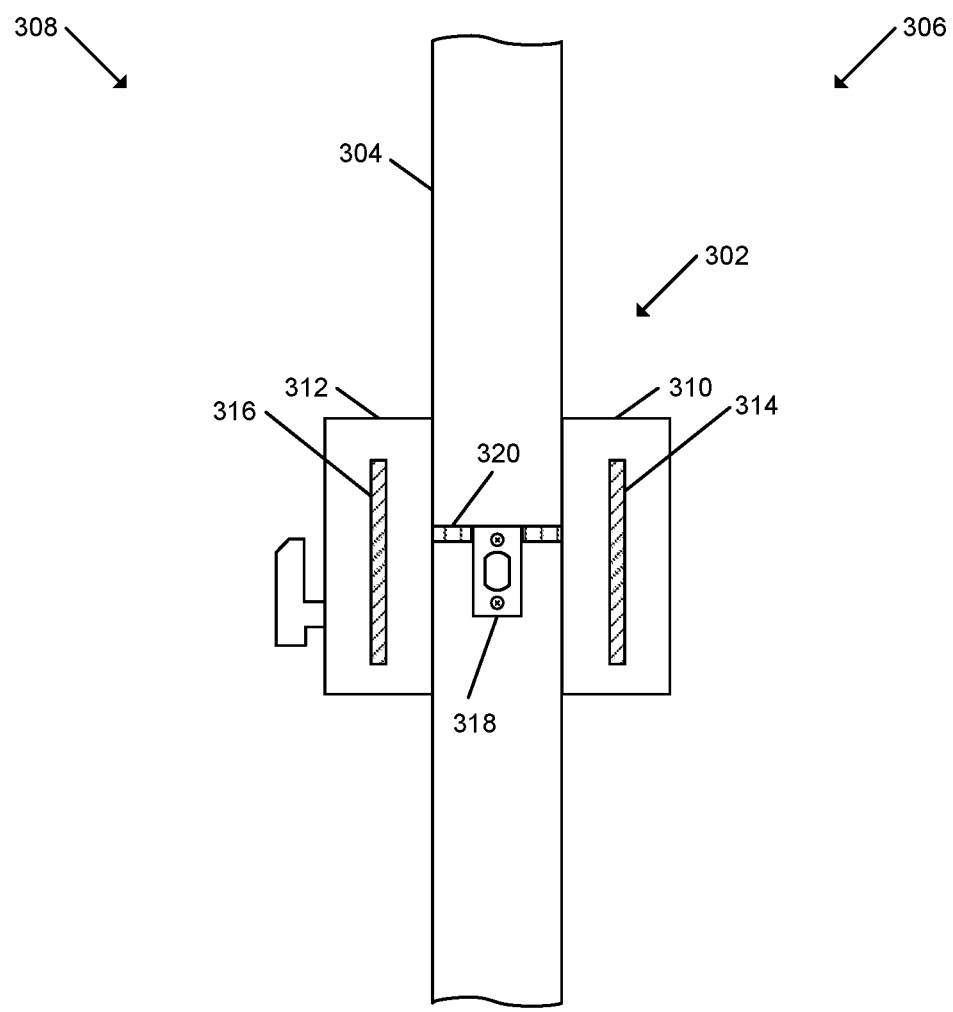
FIG. 3 is a side view of at least one embodiment of an electronic lock for levering the secure inter-processor communications.

Referring now to FIG. 3, in some embodiments, the access control device 102 may be embodied as an electronic lock similar to the electronic lock 302 of FIG. 3, which is secured to a door 304 and configured to control passage through the door 304. It should be appreciated that the door 304 has a secure side 306 (e.g., an exterior side of a perimeter door) and an unsecure side 308 (e.g., an interior side of a perimeter door). Further, as shown, the illustrative electronic lock 302 has a housing defined at least in part by an exterior escutcheon 310 configured to be secured at or to a secure side 306 of the door 304 and an interior escutcheon 312 configured to be secured at or to an unsecure side 308 of the door 304. In the illustrative embodiment, the electronic lock 302 includes a printed circuit board assembly (PCBA) 314 that is positioned within (e.g., mounted within) the exterior escutcheon 310 and a PCBA 316 that is positioned within (e.g., mounted within) the interior escutcheon. In the illustrative embodiment, the PCBA 314 is embodied as or includes (e.g., in part or entirety) an access core, and the PCBA 316 is embodied as or includes (e.g., in part or entirety) a digital core. In some embodiments, the access core includes circuitry associated with access through the electronic lock 302 (e.g., capacitive touch keypad (or other type of keypad), smart card antenna, proximity antenna/sensor, etc.), and the digital core includes wireless communication circuitry (e.g., BLE, Wi-Fi, ZigBee, etc.). However, it should be appreciated that the PCBAs 314, 316 may include additional and/or alternative circuitry in other embodiments. Further, it should be appreciated that other electronic components of the electronic lock 302 (e.g., processors, memories, sensors, etc.) may be integrated with, secured to, and/or otherwise associated with one or more of the PCBAs 314, 320 depending on the particular embodiment. The PCBA 314 may be referred to as an access core PCBA, and the PCBA 316 may be referred to as a digital core PCBA.

Although the escutcheons and sides are described herein with reference to "interior" and "exterior," it should be appreciated that such terminology is used simply for convenience and brevity of the description. For example, in some embodiments, both sides of the door 304 may be interior in the sense that both sides of the door 304 are within the perimeter of a building (e.g., as for a wholly interior door). Additionally, although the illustrative embodiment depicts the electronic lock 302 as being secured to the door 304, it should be appreciated that the electronic lock 302 (or other embodiment of the access control device 102) may be secured to a different structure in other embodiments (e.g., the door frame, a wall, etc.). For example, in some embodiments, the access control device 102 may be embodied as a wall-mounted reader or peripheral controller.

The illustrative electronic lock 302 includes a lock mechanism 318, which may be similar to the lock mechanism described above in reference to FIG. 1. In particular, the illustrative lock mechanism 318 may include a deadbolt, latch bolt, lever, and/or other mechanism that may be positioned in a locked state to secure the door 304 and prevent passage through the door 304 (i.e., when the door 304 is closed) or may be positioned in an unlocked state to allow passage through the door 304. Further, in some embodiments, the electronic lock 302 may include a wire harness 320 that extends through at least a portion of the door 304 and electrically couples various electronic components of the electronic lock 302 to one another. For example, the wire harness 320 may form a portion of circuitry that includes the PCBAs 314, 316 (and components thereon), the lock mechanism 318, and/or other components of the electronic lock 302 depending on the particular embodiment. It should be appreciated that the PCBA 314 and the PCBA 316 may be electrically coupled to one another for communication therebetween (e.g., via the wire hardness 320, electrical wire(s), communication bus(es), electrical trace(s), and/or other technologies).

Figure 4:
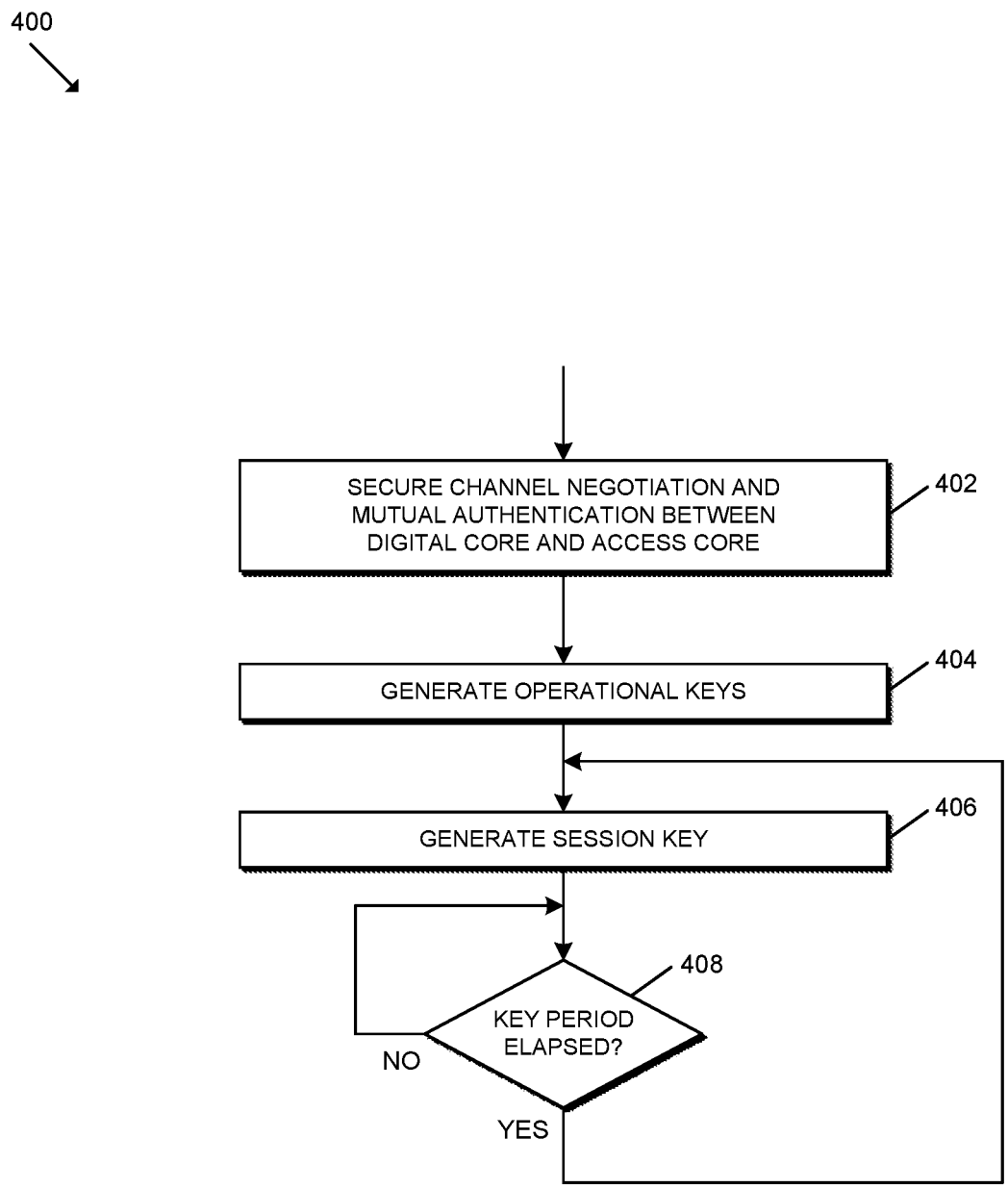
FIG. 4 is a simplified flow diagram of at least one embodiment of a method for leveraging secure inter-processor communications between a digital core and an access core of an access control device.

Referring now to FIG. 4, in use, the access control device 102 may execute a method 400 for leveraging secure inter-processor communications between a digital core and an access core of the access control device 102. It should be appreciated that the particular blocks of the method 400 are illustrated by way of example, and such blocks may be combined or divided, added or removed, and/or reordered in whole or in part depending on the particular embodiment, unless stated to the contrary. Although the description of FIG. 4 applies equally to the electronic lock 302 in various embodiments, it should be appreciated that FIG. 4 is described in reference to the access control device 102 for brevity of the description. Further, it should be appreciated that, in some embodiments, the inter-processor communications may be between two processors, microcontrollers, communication circuitries, and/or other processing circuitries of the access control device 102 (or other computing device) different from the access core and the digital core. Further, although described herein primarily as being coupled to different PCBAs for illustrative purposes (see, for example, FIG. 3), it should be appreciated that the access core and the digital core (or other circuitries involved in the inter-processor communications) may be coupled to the same PCBA in some embodiments.

The illustrative method 400 begins with flow 402 in which the access core and digital core negotiate a secure communication channel and establish mutual authentication therebetween. In some embodiments, to do so, the access control device 102 may execute the method 500 of FIG. 5 as described below. In flow 404, the access core and the digital core generate operational keys for encrypting and/or signing communications therebetween. In some embodiments, to do so, the access control device 102 may execute the method 600 of FIG. 6 as described below. In flow 506, the access core and the digital core generate one or more session keys for communication therebetween (e.g., using one or more of the operational keys). In some embodiments, to do so, the access control device 102 may execute the method 700 of FIG. 7 as described below.

It should be appreciated that the access core and digital core may periodically update the session key(s) (e.g., using the operational keys). Accordingly, in flow 408, the access control device 102 determines whether a key period has elapsed. If so, the method 400 returns to flow 406 in which the access core and digital core generate one or more new session keys. In the illustrative embodiment, the key period is one day (e.g., 24 hours), such that a new session key is generated every 24 hours. However, it should be appreciated that the access control device 102 may utilize one or more different key periods in other embodiments. Further, in some embodiments, the access control device 102 may, additionally or alternatively, generate a new session key in response to the satisfaction of another condition (e.g., in response to receiving a command from the management system 104).

Although the blocks 402-408 are described in a relatively serial manner, it should be appreciated that various blocks of the method 400 may be performed in parallel in some embodiments.

Figure 5:
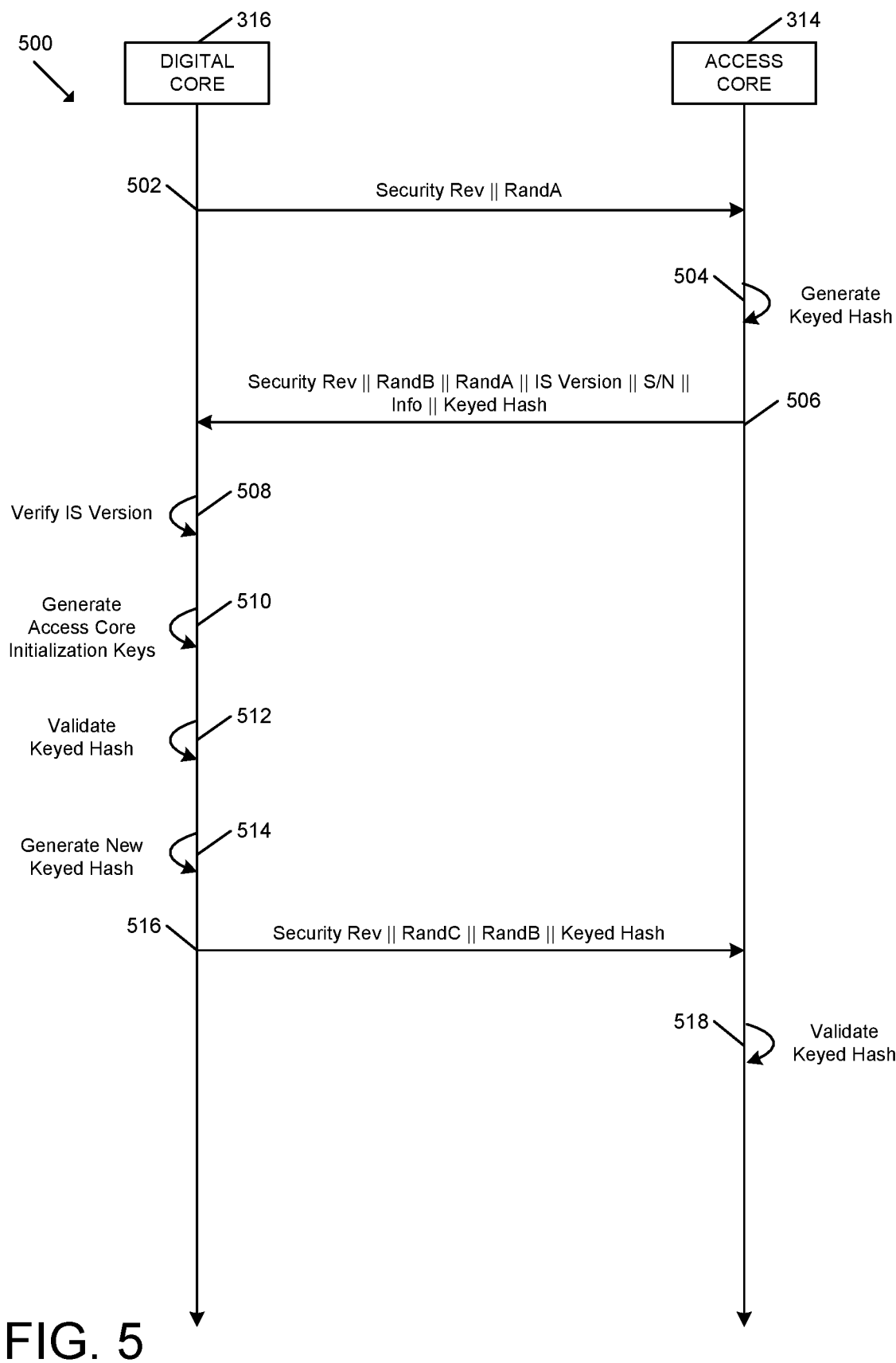
FIG. 5 is a simplified flow diagram of at least one embodiment of a method for secure channel negotiation and mutual authentication between the digital core and the access core of the access control device.

Referring now to FIG. 5, in use, the access control device 102 may execute a method 500 for secure channel negotiation and mutual authentication between the digital core and the access core of the access control device 102. It should be appreciated that the particular flows of the method 500 are illustrated by way of example, and such flows may be combined or divided, added or removed, and/or reordered in whole or in part depending on the particular embodiment, unless stated to the contrary. Although the description of FIG. 5 applies equally to the electronic lock 302 in various embodiments, it should be appreciated that FIG. 5 is described in reference to the access control device 102 for brevity of the description. Further, it should be appreciated that, in some embodiments, the inter-processor communications may be between two communication circuitries of the access control device 102 (or other computing device) different from the access core and the digital core.

In the illustrative embodiment, it should be appreciated that the method 500 assumes that the access core has already been provisioned (e.g., in the factory) with two sets of cryptographic keys that are derived from a master initialization salt key, and the digital core has already been provisioned (e.g., in the factory) with that master initialization salt key. For example, in some embodiments, the cryptographic keys provisioned to the access core and generated based on the master initialization salt key may be generated based on an HMAC key diversification function and/or other suitable key diversification technology.

The illustrative method 500 begins with flow 502 in which the digital core establishes a communication connection with the access core, and the digital core transmits a message to the access core including an identifier of the current security revision of the digital core and a random value/number. More specifically, the digital core may transmit the message Security Rev‖RandA to the access core. The security revision may indicate the particular version of security protocols being executed by the digital core. It should be appreciated that the particular values described herein as being transmitted between the access core and the digital core may be concatenated and/or otherwise grouped depending on the particular embodiment. It should be further appreciated that, in various embodiments, the particular random values/numbers described herein may be generated using a random number generator and/or a pseudorandom number generator. For example, in some embodiments, one or more of the random numbers may be generated by a cryptographically secure random number generator in accordance with the FIPS 140-2 specification.

In flow 504, the access core generates a keyed hash of the identifier of the security revision of the access core, the random value/number (RandA) transmitted by the digital core, another random value/number generated by the access core (RandB), the version of the initialization salt used by the access core, a serial number (or other unique identifier) of the access core, and/or other information of the access core (e.g., information unique to the access core). It should be appreciated that the keyed hash may be keyed using one of the cryptographic keys provisioned to the access core (e.g., in the factory) as described above. For example, in the illustrative embodiment, the keyed hash is embodied as an HMAC. However, it should be appreciated that a different type of keyed hash may be used in other embodiments.

In flow 506, the access core transmits the keyed hash along with the security revision of the access core, the random value/number (RandA) generated by the digital core, the random value/number (RandB) generated by the access core, the version of the initialization salt used by the access core (e.g., the initialization salt key from which the cryptographic keys provisioned to the access core were derived), the serial number (or other unique identifier) of the access core, and/or other information of the access core (e.g., information unique to the access core). More specifically, the access core may transmit the message Security Rev RandB RandA IS Version S/N Info Keyed Hash to the digital core.

In flow 508, the digital core reads the message/payment received from the access core and verifies the initialization salt version used by the access core to determine whether the digital core has the proper initialization salt key installed/stored within it (e.g., the initialization salt key corresponding with that particular version number). If so, in flow 510, the digital core uses the initialization salt key provisioned therein (e.g., in the factory), the serial number (or other unique identifier) of the access core, and/or the other information of the access core received from the access core to derive access core initialization keys for the access core (e.g., a unique cryptographic key set for the particular access core). In doing so, it should be appreciated that the digital core may use a diversification method or technology initially used to generate the cryptographic keys provisioned into the access core (e.g., in the factory). For example, in some embodiments, the digital core may utilize an HMAC-based key derivation function (HKDF), a simple key derivation function (KDF), and/or another suitable key diversification/derivation function or technique.

In flow 512, the digital core validates the keyed hash received from the access core. For example, the digital core may generate a keyed hash based on one or more of the derived access core initialization keys and the data received from the access core, and compare that generated keyed hash to the keyed hash received from the access core along with such data. If validated, it should be appreciated that the digital core may treat the access core as a trusted device.

In flow 514, the digital core generates a keyed hash of the security revision of the digital core (e.g., to confirm the security version on which it is operating), another random value/number generated by the digital core (RandC), the random number generated by the access core (RandB), and/or other relevant data using the cryptographic key just derived. It should be appreciated that the keyed hash may be keyed and/or generating in a manner similar to that described above in reference to flow 504.

In flow 516, the digital core transmits the keyed hash along with the security revision of the digital core, the random value/number (RandC) generated by the digital core, the random value/number (RandB) generated by the access core, and/or other relevant data to the access core. More specifically, the digital core may transmit the message Security Rev|| RandC RandB|| Keyed Hash to the access core.

In flow 518, the access core validates the keyed hash received from the digital core. For example, the access core may generate a keyed hash based on one or more of the access core initialization keys stored therein and the data received from the digital core, and compare that generated keyed hash to the keyed hash received from the digital core along with such data. If validated, it should be appreciated that the access core may treat the digital core as a trusted device. Accordingly, at this point, there may be mutual authentication between the digital core and the access core (i.e., each core trusting the other).

Although the flows 502-518 are described in a relatively serial manner, it should be appreciated that various flows of the method 500 may be performed in parallel in some embodiments.

Figure 6:
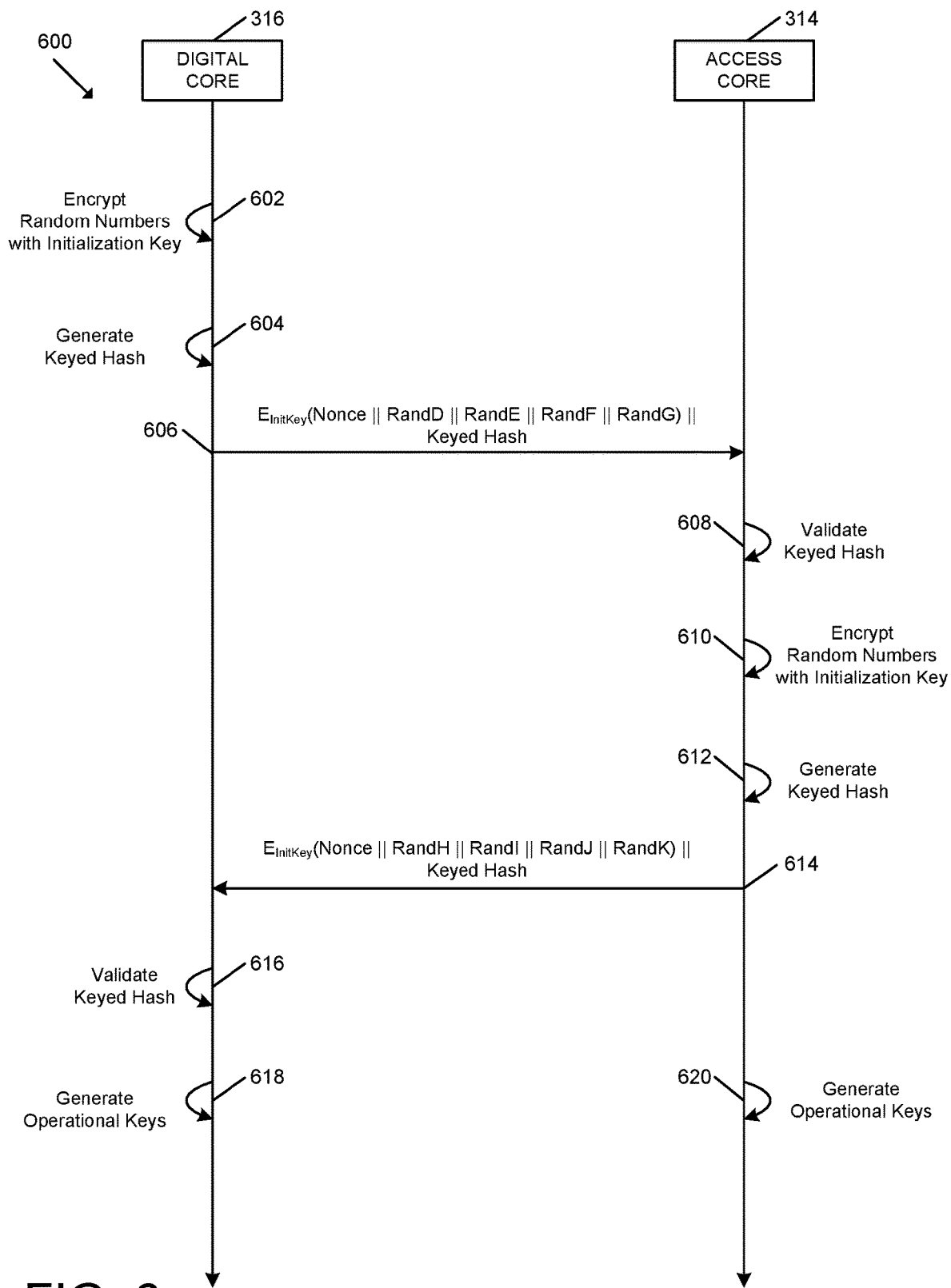
FIG. 6 is a simplified flow diagram of at least one embodiment of a method for generating operational keys.

Referring now to FIG. 6, in use, the access control device 102 may execute a method 600 for generating operational keys. It should be appreciated that the particular flows of the method 600 are illustrated by way of example, and such flows may be combined or divided, added or removed, and/or reordered in whole or in part depending on the particular embodiment, unless stated to the contrary. Although the description of FIG. 6 applies equally to the electronic lock 302 in various embodiments, it should be appreciated that FIG. 6 is described in reference to the access control device 102 for brevity of the description. Further, it should be appreciated that, in some embodiments, the inter-processor communications may be between two communication circuitries of the access control device 102 (or other computing device) different from the access core and the digital core.

The illustrative method 600 begins with flow 602 in which the digital core encrypts a set of random values/numbers using one of the initialization keys derived by the digital core (see FIG. 5) and provisioned to the access core. More specifically, in some embodiments, the digital core may encrypt four random values/numbers and a nonce (e.g., $E_{InitKey}$(Nonce||RandD||RandE||RandF||RandG)) to generate an encrypted message. It should be appreciated that the set of random values/numbers may be encrypted using any encryption technology that is otherwise consistent with the features described herein. In the illustrative embodiment, the digital core leverages a symmetric cryptographic encryption algorithm, which is generally more processor efficient than asymmetric encryption; however, other types of encryption may be utilized in other embodiments. Although four random values/numbers and a nonce are described as being generated in the illustrative embodiment, it should be appreciated that a different number of random values/numbers and/or nonces may be generated and encrypted in other embodiments.

In flow 604, the digital core generates a keyed hash of the encrypted message using one of the derived cryptographic keys discussed above. It should be appreciated that the keyed hash may be keyed and/or generated in a manner similar to that described above in reference to flow 514 of FIG. 5. In flow 606, the digital core transmits the encrypted message along with the keyed hash of the encrypted message to the access core. More specifically, the digital core may transmit the message $E_{InitKey}$(Nonce∥RandD∥RandE∥RandF∥RandG)∥Keyed Hash to the access core.

In flow 608, the access core validates the keyed hash received from the digital core. For example, the access core may generate a keyed hash based on one of the access core initialization keys and the encrypted message received from the digital core, and compare that generated keyed hash to the keyed hash received from the digital core along with the encrypted message.

In flow 610, the access core encrypts another set of random values/numbers using one of the initialization keys provisioned to the access core (e.g., in the factory). More specifically, in some embodiments, the access core may encrypt four random values/numbers and a nonce (e.g., $E_{InitKey}$(Nonce∥RandH∥RandI∥RandJ∥RandK)) to generate an encrypted message. In the illustrative embodiment, it should be appreciated that the access core utilizes the same encryption algorithm as used by the digital core (see, for example, flow 602); however, it should be appreciated that a different encryption algorithm may be used by the access core in other embodiments. Additionally, although four random values/numbers and a nonce are described as being generated in the illustrative embodiment, it should be appreciated that a different number of random values/numbers and/or nonces may be generated in other embodiments.

In flow 612, the access core generates a keyed hash of the encrypted message (i.e., the message encrypted by the access core) using one of the access core initialization keys in a manner similar to that described above (see, e.g., flow 504 of FIG. 5). In flow 614, the access core transmits the encrypted message along with the keyed hash of the encrypted message to the digital core. More specifically, the access core may transmit the message $E_{InitKey}$(Nonce∥RandH∥Rand∥Rand∥RandK)∥ Keyed Hash to the digital core. In flow 616, the digital core validates the keyed hash received from the access core. For example, the digital core may generate a keyed hash based on one or more of the derived initialization keys and the encrypted message received from the access core, and compare that generated keyed hash to the keyed hash received from the access core along with the encrypted message.

In flows 618-620, the digital core and the access core use the various random values/numbers that were generated in order to generate a set of cryptographic operational keys to be used by the digital core and the access core for various communications and/or functions. In particular, in flow 618, the digital core decrypts the encrypted message received from the access core (e.g., using the corresponding derived initialization key) to parse/read the various random values/numbers (e.g., Rand∥RandI∥RandJ∥RandK), and generates one or more operational keys based on the random values/numbers. It should be further appreciated that the digital core also knows the random values/numbers that it generated (e.g., RandD∥RandE∥RandF∥RandG). Similarly, in flow 620, the access core decrypts the encrypted message received from the digital core using the corresponding initialization key to parse/read the various random values/numbers (e.g., RandD∥RandE∥RandF∥RandG), and generates one or more operational keys based on the random values/numbers. It should be further appreciated that the access core also knows the random values/numbers that it generated (e.g., RandH∥RandI∥RandJ∥RandK). In other words, at this point, it should be appreciated that both the digital core and the access core know all eight random values/numbers.

In the illustrative embodiment, each of the digital core and the access core generates an operational key, an operational HMAC key, a key transfer key, and a key transfer HMAC key. More specifically, each of the digital core and the access core generates the operational key according to RandD XOR RandH, generates the operational HMAC key according to RandE XOR RandI, generates the key transfer key according to RandF XOR RandJ, and generates the key transfer HMAC key according to RandG XOR RandK. Although the operational keys are generated based on an exclusive-or operation in the illustrative embodiment, it should be appreciated that the operational keys may be otherwise generated (e.g., based on a different combination of random values/numbers) in other embodiments. It should be appreciated that the operational keys may be subsequently used to secure communication between the digital core and the access core, while reducing the frequency of direct use of the initialization key set described above.

Although the flows 602-620 are described in a relatively serial manner, it should be appreciated that various flows of the method 600 may be performed in parallel in some embodiments.

Figure 7:
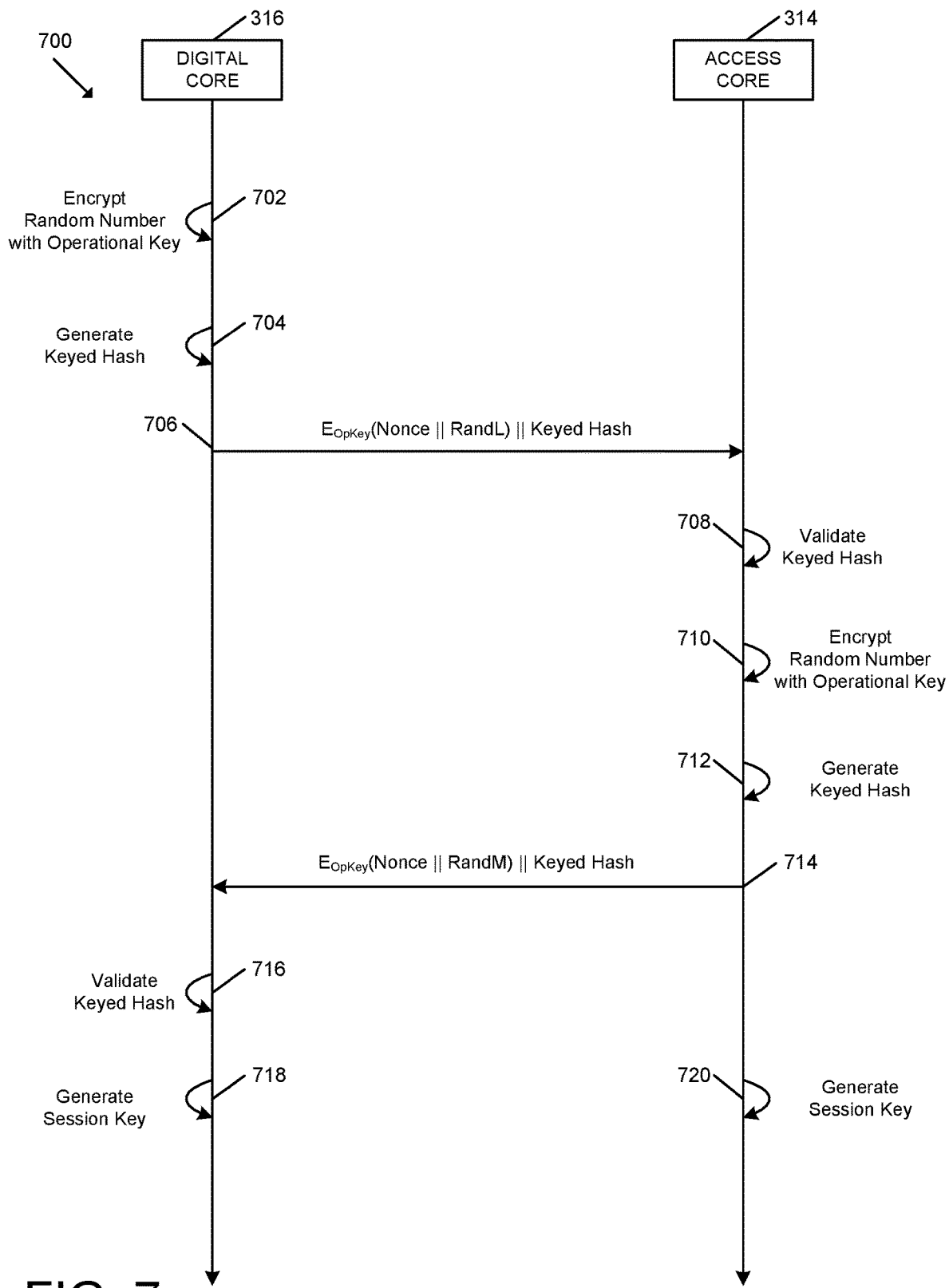
FIG. 7 is a simplified flow diagram of at least one embodiment of a method for generating session keys.

Referring now to FIG. 7, in use, the access control device 102 may execute a method 700 for generating session keys. It should be appreciated that the particular flows of the method 700 are illustrated by way of example, and such flows may be combined or divided, added or removed, and/or reordered in whole or in part depending on the particular embodiment, unless stated to the contrary. Although the description of FIG. 7 applies equally to the electronic lock 302 in various embodiments, it should be appreciated that FIG. 7 is described in reference to the access control device 102 for brevity of the description. Further, it should be appreciated that, in some embodiments, the inter-processor communications may be between two communication circuitries of the access control device 102 (or other computing device) different from the access core and the digital core.

The illustrative method 700 begins with flow 702 in which the digital core encrypts a random value/number using the derived operational key (see, for example, FIG. 6). More specifically, in some embodiments, the digital core may encrypt a random value/number and a nonce (e.g., $E_{OpKey}$(Nonce∥RandL)) to generate an encrypted message. It should be appreciated that the random value/number (e.g., and nonce) may be encrypted using any encryption technology that is otherwise consistent with the features described herein. In the illustrative embodiment, the digital core leverages a symmetric cryptographic encryption algorithm; however, other types of encryption may be utilized in other embodiments. Although one random value/number and a nonce are described as being generated in the illustrative embodiment, it should be appreciated that a different number of random values/numbers and/or nonces may be generated and encrypted in other embodiments.

In flow 704, the digital core generates a keyed hash of the encrypted message using one of the derived cryptographic keys discussed above. It should be appreciated that the keyed hash may be keyed using one of the operational keys previously generated (see, for example, FIG. 6). For example, in the illustrative embodiment, the keyed hash is embodied as an HMAC and they key is the operational HMAC key. However, it should be appreciated that a different type of keyed hash may be used in other embodiments. In flow 706, the digital core transmits the encrypted message along with the keyed hash of the encrypted message to the access core. More specifically, the digital core may transmit the message $E_{OpKey}$(Nonce||RandL)||Keyed Hash to the access core.

In flow 708, the access core validates the keyed hash received from the digital core. For example, the access core may generate a keyed hash based on one of the operational keys generated by the access core (e.g., the operational HMAC key) and the encrypted message received from the digital core, and compare that generated keyed hash to the keyed hash received from the digital core along with the encrypted message.

In flow 710, the access core encrypts another random value/number using the derived operational key (see, for example, FIG. 6). More specifically, in some embodiments, the access core may encrypt a random value/number and a nonce (e.g., $E_{OpKey}$(Nonce||RandM)) to generate the encrypted message. In the illustrative embodiment, it should be appreciated that the access core utilizes the same encryption algorithm as used by the digital core (see, for example, flow 702); however, it should be appreciated that a different encryption algorithm may be used by the access core in other embodiments. Additionally, although one random value/number and a nonce are described as being generated in the illustrative embodiment, it should be appreciated that a different number of random values/numbers and/or nonces may be generated and encrypted in other embodiments.

In flow 712, the access core generates a keyed hash of the encrypted message (i.e., the message encrypted by the access core) using one of the derived cryptographic keys in a manner similar to that described above (see, for example, flow 704 of FIG. 7). It should be appreciated that the keyed hash may be keyed using one of the operational keys previously generated (see, for example, FIG. 6). For example, in the illustrative embodiment, the keyed hash is embodied as an HMAC and the key is the operational HMAC key. However, it should be appreciated that a different type of keyed hash may be used in other embodiments. In flow 714, the access core transmits the encrypted message along with the keyed hash of the encrypted message to the digital core. More specifically, the digital core may transmit the message $E_{OpKey}$(Nonce||RandM)|| Keyed Hash to the access core.

In flow 716, the digital core validates the keyed hash received from the access core. For example, the digital core may generate a keyed hash based on one or more of the operational keys generated by the digital core (e.g., the operational HMAC key) and the encrypted message received from the access core, and compare that generated keyed hash to the keyed hash received from the access core along with the encrypted message.

In flows 718-720, the digital core and the access core use the various random values/numbers that were generated in order to generate one or more session keys to be used by the digital core and the access for various communications therebetween for a session period. In particular, in flow 718, the digital core decrypts the encrypted message received from the access core (e.g., using the operational key) to parse/read the various random values/numbers (e.g., RandM), and generates one or more session keys based on the random values/numbers. It should be further appreciated that the digital core also knows the random values/numbers that it generated (e.g., RandL). Similarly, in flow 720, the access core decrypts the encrypted message received from the digital core (e.g., using the operational key) to parse/read the various random values/numbers (e.g., RandL), and generates one or more session keys based on the random values/numbers. It should be further appreciated that the access core also knows the random values/numbers that it generated (e.g., RandM). In other words, at this point, it should be appreciated that both the digital core and the access core know all of the random values/numbers to generate the session key(s) (e.g., RandL and RandM).

In the illustrative embodiment, each of the digital core and the access core generates the session key according to RandL XOR RandM. Although the session key is generated based on an exclusive-or operation in the illustrative embodiment, it should be appreciated that the session key may be otherwise generated (e.g., based on a different combination of newly generated random values/numbers) in other embodiments. It should be further appreciated that, in the illustrative embodiment, the digital core and the access core may use the session key (or set of session keys) for one day (24 hours), and then a new session key (or set of session keys) may be regenerated periodically (e.g., every 24 hours). For example, to do so, the digital core and the access core may re-execute the method 700 of FIG. 7 to generate a new session key (or set of session keys). In some embodiments, the digital core may transmit a "new session" command or message to the access core to initiate the rolling of the session key.

Although the flows 702-720 are described in a relatively serial manner, it should be appreciated that various flows of the method 700 may be performed in parallel in some embodiments.

Figure 8:
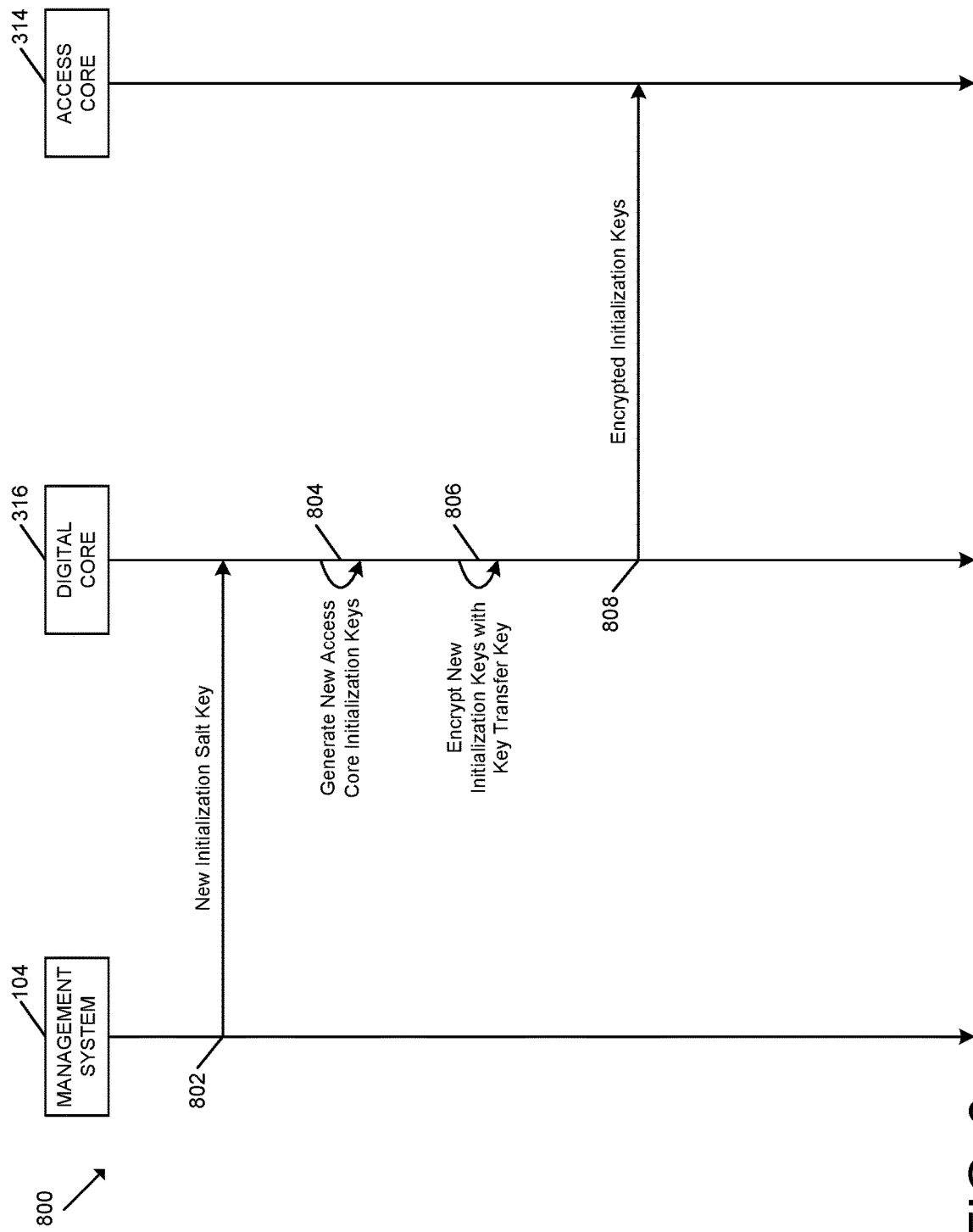
FIG. 8 is a simplified flow diagram of at least one embodiment of a method for rolling an initialization salt key.

Referring now to FIG. 8, in use, the access control device 102 may execute a method 800 for rolling an initialization salt key. It should be appreciated that the particular flows of the method 800 are illustrated by way of example, and such flows may be combined or divided, added or removed, and/or reordered in whole or in part depending on the particular embodiment, unless stated to the contrary. Although the description of FIG. 8 applies equally to the electronic lock 302 in various embodiments, it should be appreciated that FIG. 8 is described in reference to the access control device 102 for brevity of the description. Further, it should be appreciated that, in some embodiments, the inter-processor communications may be between two communication circuitries of the access control device 102 (or other computing device) different from the access core and the digital core.

The illustrative method 800 begins with flow 802 in which the management system 104 may determine a need to roll the initialization salt key that is currently stored in the digital core, and transmits the new initialization salt key to the digital core over a secure communication channel established between the management system 104 and the digital core. It should be appreciated that the management system 104 may determine the need to roll the initialization salt key in response to the occurrence of one or more conditions (e.g., periodically, security breach, administrative user input, etc.). Further, in some embodiments, the management system 104 generates the new initialization salt key itself, whereas in other embodiment another device/system generates the new initialization salt key and securely transmits the key to the management system 104 for forwarding to the digital core. In addition to transmitting the new initialization salt key to the digital core, it should be appreciated that the management system 104 may also transmit the initialization salt version of that key (e.g., an identifier indicative of the initialization salt version).

In flow 804, the digital core generates new access core initialization keys based on the new initialization salt key and the access control serial number (and/or other access core information) in a manner similar to that described above. In flow 806, the digital core encrypts the new access core initialization keys using the key encryption key generated as part of the operational keys described above (see FIG. 6), and in block 808, the digital core transmits the encrypted initialization keys to the access core. The access core may decrypt the encrypted initialization keys using its own previously derived key transfer key (see FIG. 6), and replace the previous access core initialization keys with the new access core initialization keys. Further, in some embodiments, it should be appreciated that the encrypted initialization keys message may be transmitted from the digital core to the access core along with a keyed hash (e.g., keyed using the key transfer HMAC key), which may be validated by the access core in a manner similar to that described above.

In some embodiments, in order to prevent, for example, an access core from being maliciously removed and replaced with a fraudulent one in order for a bad actor to gain control of the access control device 102, for any access core that has already been securely communicating with a digital core (e.g., commissioned), in order for a digital core to communicate with a new access core, the digital core may undergo a factory default reset (FDR).

Although the flows 802-808 are described in a relatively serial manner, it should be appreciated that various flows of the method 800 may be performed in parallel in some embodiments. It should be further appreciated that, after executing the method 800 of FIG. 8 to update the initialization salt in the digital core and the access core initialization keys in the access core, the access control device 102 may execute the method 400 of FIG. 4 using the new keys.

It should be appreciated that the key transfer key may also allow for securely transmitting highly sensitive data between the digital core and the access core in various use cases. For example, in some embodiments, the digital core may leverage the key transfer key to encrypt communications with the access core to transfer smart credential master keys from the management system 104 to the access core. Further, in some embodiments, the key transfer key may be used for transmitting data from a cloud system (e.g., part of the management system 104) to the access core (via the digital core) related to device configuration or key management.

What is claimed is:

1. An electronic lock configured to be secured to a door having an exterior side and an interior side, the electronic lock comprising:
    an exterior escutcheon on the exterior side of the door;
    an interior escutcheon on the interior side of the door;
    a digital core printed circuit board assembly (PCBA) positioned within the interior escutcheon, wherein the digital core PCBA comprises at least one first processor and at least one first memory and is configured to facilitate wireless communications, wherein the at least one first memory is provisioned with a master initialization salt key; and
    an access core PCBA electrically coupled to the digital core PCBA and positioned within the exterior escutcheon, wherein the access core PCBA comprises at least one second processor and at least one second memory and is configured to facilitate access control, wherein the at least one second memory is provisioned with an access core initialization key derived from the master initialization salt key;
    wherein the digital core PCBA establishes a secure communication channel with the access core PCBA via an electrical connection between the digital core PCBA and the access core PCBA based on the master initialization salt key and the access core initialization key;
    wherein the at least one first processor of the digital core PCBA generates the access core initialization key based on a unique identifier of the access core and the master initialization salt key; and
    wherein each of the at least one first processor of the digital core PCBA and the at least one second processor of the access core PCBA generates a set of operational keys based on the access core initialization key.

2. The electronic lock of claim 1, wherein the access core PCBA comprises a capacitive touch keypad.

3. The electronic lock of claim 1, wherein the access core PCBA comprises at least one of a smart card antenna or a proximity antenna.

4. The electronic lock of claim 1, wherein the digital core PCBA comprises a wireless communication circuitry.

5. The electronic lock of claim 1, wherein the access core initialization key is derived based on an HMAC-based key derivation function (HKDF), a unique identifier of the access core, and the master initialization salt key.

6. The electronic lock of claim 1, wherein the digital core PCBA communicates with the access core PCBA to perform mutual authentication.

7. The electronic lock of claim 1, wherein each of the at least one first processor of the digital core PCBA and the at least one second processor of the access core PCBA generates a session key based on at least one operational key of the set of operational keys.

8. The electronic lock of claim 7, wherein each of the at least one first processor of the digital core PCBA and the at least one second processor of the access core PCBA periodically rolls the session key.

9. The electronic lock of claim 1, wherein the set of operational keys includes a key transfer key; and
    wherein the at least one first processor of the digital core PCBA is configured to (i) replace the master initialization salt key with a new master initialization salt key received from a management system, (ii) generate a new access core initialization key based on the new master initialization salt key and the unique identifier of the access core, (iii) encrypt the new access core initialization key using the key transfer key, and (iv) transmit the encrypted new access core initialization key to the access core PCBA.

10. An access control device, comprising:
    a lock mechanism adapted to control access to a passageway;
    a digital core printed circuit board assembly (PCBA) that includes at least one first processor and at least one first memory and is configured to facilitate wireless communications, wherein the at least one first memory is provisioned with a master initialization salt key; and
    an access core PCBA electrically coupled to the digital core PCBA, wherein the access core PCBA includes at least one second processor and at least one second memory and is configured to facilitate access control, and wherein the at least one second memory is provisioned with an access core initialization key derived from the master initialization salt key;
    wherein the digital PCBA establishes a secure communication channel with the access core PCBA via an electrical connection between the digital PCBA and the access core PCBA based on the master initialization salt key and the access core initialization key;

wherein the at least one first processor of the digital core PCBA generates the access core initialization key based on a unique identifier of the access core and the master initialization salt key; and wherein each of the at least one first processor of the digital core PCBA and the at least one second processor of the access core PCBA securely generates a set of operational keys using the access core initialization key.

11. The access control device of claim 10, wherein the access core PCBA comprises a capacitive touch keypad.

12. The access control device of claim 10, wherein the access core PCBA comprises at least one of a smart card antenna or a proximity antenna.

13. The access control device of claim 10, wherein the digital core PCBA comprises a wireless communication circuitry.

14. The access control device of claim 10, wherein the access core initialization key is derived based on an HMAC-based key derivation function (HKDF), a unique identifier of the access core, and the master initialization salt key.

15. The access control device of claim 10, wherein the digital core PCBA communicates with the access core PCBA to perform mutual authentication.

16. The access control device of claim 10, wherein each of the at least one first processor of the digital core PCBA and the at least one second processor of the access core PCBA generates a session key using at least one operational key of the set of operational keys.

17. The access control device of claim 16, wherein each of the at least one first processor of the digital core PCBA and the at least one second processor of the access core PCBA periodically rolls the session key.

18. The access control device of claim 10, wherein the set of operational keys includes a key transfer key; and wherein the at least one first processor of the digital core PCBA is configured to (i) replace the master initialization salt key with a new master initialization salt key received from a management system, (ii) generate a new access core initialization key based on the new master initialization salt key and the unique identifier of the access core, (iii) encrypt the new access core initialization key using the key transfer key, and (iv) transmit the encrypted new access core initialization key to the access core PCBA.

* * * * *